United States Patent
Husak et al.

[11] Patent Number: 5,949,783
[45] Date of Patent: Sep. 7, 1999

[54] LAN EMULATION SUBSYSTEMS FOR SUPPORTING MULTIPLE VIRTUAL LANS

[75] Inventors: David J. Husak, Windham; Floyd J. Backes, Peterborough, both of N.H.

[73] Assignee: 3COM Corporation, Santa Clara, Calif.

[21] Appl. No.: 08/929,196

[22] Filed: Sep. 8, 1997

[51] Int. Cl.[6] .................................................. H04L 12/50
[52] U.S. Cl. ........................ 370/396; 370/401; 370/432
[58] Field of Search .................... 370/230, 235, 370/252, 386, 389, 390, 395, 396, 400, 401, 409, 432; 379/220; 395/200.31, 200.33, 200.68, 200.72

[56] References Cited

U.S. PATENT DOCUMENTS

| | | | |
|---|---|---|---|
| 4,823,338 | 4/1989 | Chan et al. | 370/522 |
| 5,361,256 | 11/1994 | Doeringer et al. | 370/390 |
| 5,394,402 | 2/1995 | Ross | 370/402 |
| 5,444,702 | 8/1995 | Burnett | 370/254 |
| 5,453,980 | 9/1995 | Van Engelshoven | 370/395 |
| 5,600,644 | 2/1997 | Chang et al. | 370/404 |
| 5,752,003 | 5/1998 | Hart | 395/500 |
| 5,805,805 | 9/1998 | Civanlar et al. | 395/200.5 |
| 5,828,665 | 10/1998 | Husak | 370/387 |

OTHER PUBLICATIONS

The ATM Forum, Technical Committee. "LAN Emulation over ATM," Version 1.0.

Primary Examiner—Chi H. Pham
Assistant Examiner—Ricky Q. Ngo
Attorney, Agent, or Firm—Weingarten, Schurgin, Gagnebin & Hayes LLP

[57] ABSTRACT

An apparatus and method are disclosed for efficiently supporting multiple VLAN's over an emulated LAN having a plurality of distributed LAN emulation servers. Each distributed LAN emulation server in an emulated LAN has a list of VLAN's that are reachable over each of its preestablished output connections. Each distributed LAN emulation server in the emulated LAN also has a predetermined threshold value for determining the most efficient utilization of its preestablished output connections.

26 Claims, 11 Drawing Sheets

| | CONNECTION (VCC) | | | |
|---|---|---|---|---|
| VLAN | 64A | 66A | 66B | 66C |
| X | 14A,B,C | YES | YES | NO |
| Y | 14D | YES | YES | YES |
| Z | NO | YES | NO | YES |
| * | FLOOD/DROP | | | |

*FIG. 5A*

| | CONNECTION (VCC) | | | | | |
|---|---|---|---|---|---|---|
| VLAN | 64A | 66A | 66B | 66C | 82 | 84 |
| X | 14A,B,C | YES | YES | NO | NO | 42C,D |
| Y | 14D | YES | YES | YES | YES | YES |
| Z | NO | YES | NO | YES | NO | 42B,D |
| * | FLOOD/DROP | | | | | |

| VLAN | CONNECTION (VCC) | | | |
|---|---|---|---|---|
| | 64B | 66D | 66E | 66F |
| X | NO | YES | YES | YES |
| Y | 14F | YES | YES | YES |
| Z | 14E | NO | YES | NO |
| * | FLOOD/DROP | | | |

*FIG. 7A*

| VLAN | CONNECTION (VCC) | | | | |
|---|---|---|---|---|---|
| | 64B | 66D | 66E | 66F | 86 |
| X | NO | YES | YES | YES | YES |
| Y | 14F | YES | YES | YES | YES |
| Z | 14E | NO | YES | NO | 42D |
| * | FLOOD/DROP | | | | |

| VLAN | CONNECTION (VCC) | | | |
|---|---|---|---|---|
| | 64C | 66G | 66H | 66I |
| X | 14I | NO | YES | YES |
| Y | 14G,H | YES | YES | YES |
| Z | NO | YES | NO | YES |
| * | FLOOD/DROP | | | |

*FIG. 9A*

| VLAN | CONNECTION (VCC) | | | | |
|---|---|---|---|---|---|
| | 64C | 66G | 66H | 66I | 88 |
| X | 14I | NO | YES | YES | 42A,D |
| Y | 14G,H | YES | YES | YES | YES |
| Z | NO | YES | NO | YES | 42B,D |
| * | FLOOD/DROP | | | | |

| VLAN | CONNECTION (VCC) | | | |
|---|---|---|---|---|
| | 64D | 66J | 66K | 66L |
| X | 14J | YES | NO | YES |
| Y | 14K | YES | YES | YES |
| Z | 14L | NO | YES | NO |
| * | FLOOD/DROP | | | |

*FIG. 11A*

| VLAN | CONNECTION (VCC) | | | | |
|---|---|---|---|---|---|
| | 64D | 66J | 66K | 66L | 90 |
| X | 14J | YES | NO | YES | 42A,C |
| Y | 14K | YES | YES | YES | YES |
| Z | 14L | NO | YES | NO | 42B |
| * | FLOOD/DROP | | | | |

*FIG. 11B*

LAN EMULATION SUBSYSTEMS FOR SUPPORTING MULTIPLE VIRTUAL LANS

BACKGROUND OF THE INVENTION

Local Area Network (LAN) emulation enables the implementation of an emulated LAN over an Asynchronous Transfer Mode (ATM) network. An emulated LAN provides for the communication of data frames among all of the users in the emulated LAN, similar to a physical LAN. One or more emulated LAN's may run on the same ATM network. However, each emulated LAN is independent, and users cannot communicate directly across emulated LAN boundaries.

Communication between emulated LAN's is possible only through routers or bridges, which may be implemented in a common ATM end station.

An emulated LAN may be one of two types: Ethernet/IEEE 802.3 or IEEE 802.5 (Token Ring). Each emulated LAN typically comprises a single LAN Emulation Service (LE Service) and a plurality of LAN Emulation Clients (LEC's).

An LE Service comprises a LAN Emulation Configuration Server (LECS), a LAN Emulation Server (LES), and a Broadcast and Unknown Server (BUS). An LE Service may be implemented in an ATM end station (e.g., a bridge, router, or host), or in a specific ATM network device (e.g., a switch). An LE Service may be centralized or distributed throughout an ATM network.

Each LEC is part of an ATM end station and represents one or more user devices, each of which is identified by a Medium Access Control (MAC) address. Each LEC performs data forwarding, address resolution, and other functions for associated ATM end station user devices. Each LEC must be assigned to an LE Service of an emulated LAN before it can communicate with other LEC's within the emulated LAN. Communication between LEC's and between an LEC and its assigned LE Service is performed over ATM Virtual Channel Connections (VCC's).

An LECS implements the assignment of individual LEC's to various emulated LAN's. Based upon its own policies, configuration databases, and information provided by LEC's, an LECS assigns any LEC which requests configuration information to a particular LE Service. The LECS assigns an LEC to a particular LE Service by giving the LEC the ATM address of an LES associated with that particular LE Service, along with other necessary operating parameters. The LECS provides the ATM address of the LES to the LEC over a configuration VCC which is established between the LECS and the LEC.

An LES implements the control coordination function for an emulated LAN. That is, an LES provides a facility for registering MAC addresses and/or route descriptors, and for resolving MAC addresses and/or route descriptors to ATM addresses. An LEC will register the user devices that it represents with the LES to which it is assigned. An LEC will also query its assigned LES when the LEC wishes to resolve a MAC address and/or route descriptor to an ATM address. The LES will either respond directly to the LEC which initiated the query or forward the query to other LEC's so that they may respond. An LEC communicates with its assigned LES over control VCC's which are established between the LEC and the LES.

An LES always exists with a BUS in an emulated LAN. A BUS handles all broadcast, multicast, and unknown data traffic to and from an LEC. That is, all broadcast, multicast, and unknown data traffic to and from an LEC passes through a BUS. A BUS receives and delivers this data traffic through multicast VCC's which are established between the BUS and each associated LEC. Multicast VCC's are established between a BUS and an associated LEC after the ATM address of the BUS is provided to the LEC by its assigned LES in an address resolution procedure.

Since an LES and a BUS always coexist in an emulated LAN, they may be coupled together into a combined LES/BUS server. In order to minimize the utilization of ATM network resources in an emulated LAN, a plurality of LES/BUS servers, or LES/BUS subservers, may be distributed throughout an ATM network. In such a case, each LEC is assigned to a "local" LES/BUS subserver, and the appropriate VCC's are established between each LEC and its local LES/BUS subserver. VCC's are also established between or among the plurality of LES/BUS subservers.

Similar to a physical LAN, an emulated LAN may support multiple Virtual LAN's (VLAN's). That is, an emulated LAN may be divided into multiple VLAN's, each of which allows communication between user devices that share some common trait. For example, a VLAN might include the user devices of a group of workers in a given department if it is assumed that such workers are likely to communicate most frequently amongst themselves.

Communication between user devices within a VLAN is performed according to a VLAN identification tagging scheme.

That is, IEEE Standard 802.1p dictates the communication protocol for user devices within a VLAN, and IEEE Standard 802.1q dictates that a data frame must contain a VLAN "tag" which identifies the VLAN from which the data frame originated. Such a VLAN tag may then be used to filter data frames. Consequently, user devices which are not associated with the VLAN indicated by the VLAN tag need not be burdened by the intensive processing that is typically required to determine whether a data frame is destined for such user devices. Thus, network efficiency is improved.

While VLAN identification tagging improves network efficiency by reducing the processing of data frames in a VLAN environment, data frames may still be processed in an inefficient manner in an emulated LAN supporting one or more VLAN's. That is, data frames having VLAN tags may be unnecessarily forwarded over an established point-to-multipoint VCC from a local LES/BUS subserver in an emulated LAN supporting one or more VLAN's. For example, a data frame having a VLAN tag may be unnecessarily forwarded over an established point-to-multipoint VCC from a LES/BUS subserver to all of the "local" LEC's within a corresponding LES/BUS subserver group that represent one or more user devices which are members of the VLAN indicated by the VLAN tag.

Furthermore, data frames having VLAN tags may be unnecessarily reproduced for forwarding over established point-to-point VCC's from a local LES/BUS subserver in an emulated LAN supporting one or more VLAN's. For example, a data frame having a VLAN tag may be unnecessarily reproduced for forwarding over established point-to-point VCC's from a LES/BUS subserver to all other LES/BUS subservers in an emulated LAN which provide connections to "local" LEC's that represent one or more user devices which are members of the VLAN indicated by the VLAN tag. Accordingly, it would be desirable to prevent the unnecessary forwarding and reproduction of data frames by LES/BUS subservers in an emulated LAN supporting one or more VLAN's, thereby further improving network efficiency.

BRIEF SUMMARY OF THE INVENTION

An apparatus and method are contemplated for efficiently supporting multiple VLAN's over an emulated LAN having a plurality of distributed LAN emulation servers. Each distributed LAN emulation server in an emulated LAN has a list of VLAN's that are reachable over each of its preestablished output connections. Each distributed LAN emulation server in the emulated LAN also has a predetermined threshold value for determining the most efficient utilization of its preestablished output connections. That is, for each data frame having a VLAN tag that is received by a distributed LAN emulation server, the distributed LAN emulation server will identify the number of preestablished output connections over which the VLAN corresponding to the VLAN tag is reachable, or the number of LAN emulation destinations through which the VLAN corresponding to said VLAN tag is reachable. The distributed LAN emulation server will then compare the number to the predetermined threshold value. If the distributed LAN emulation server has a plurality of preestablished point-to-point output connections, and the number of preestablished output connections over which the VLAN corresponding to the VLAN tag is reachable is greater than the predetermined threshold value, then the distributed LAN emulation server may establish an additional point-to-multipoint output connection over which the data frame may be forwarded. If the distributed LAN emulation server has a preestablished point-to-multipoint output connection, and the number of LAN emulation destinations through which the VLAN corresponding to said VLAN tag is reachable is less than the predetermined threshold value, then the distributed LAN emulation server may establish at least one additional point-to-point output connection over which the data frame may be forwarded. Thus, each distributed LAN emulation server in the emulated LAN makes a determination as to what is the most efficient utilization of its own output connections based upon a VLAN membership list and a predetermined threshold value.

BRIEF DESCRIPTION OF THE DRAWINGS

The present invention will be more fully understood by reference to the following detailed description and the appended drawings of which.

DETAILED DESCRIPTION OF THE INVENTION

Figure 1:
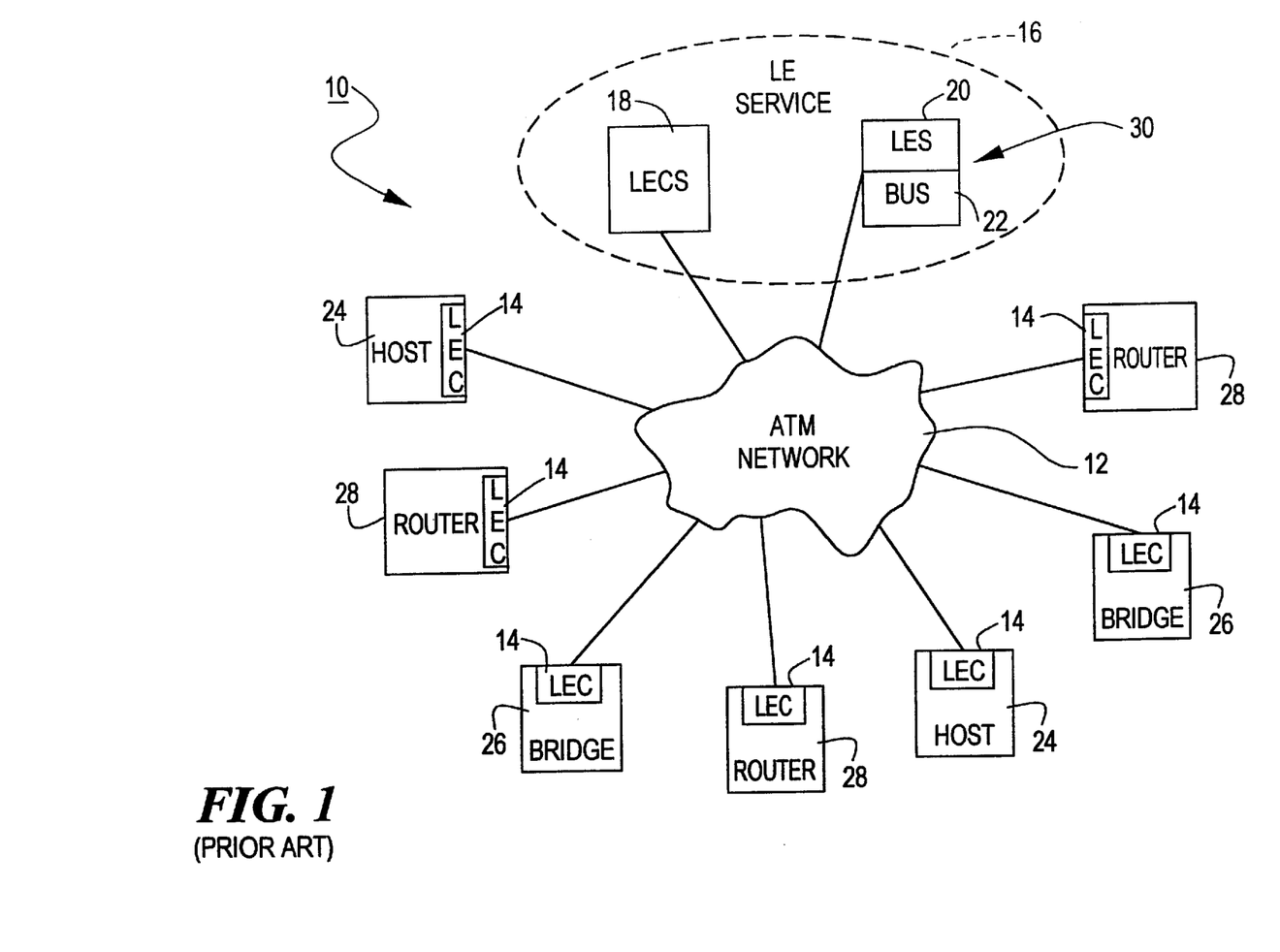
FIG. 1 is a block diagram illustrating a prior art network topology of a typical emulated LAN over an ATM network.

Referring to FIG. 1, a block diagram is shown illustrating the topology of a prior art emulated Local Area Network (LAN) 10 over an Asynchronous Transfer Mode (ATM) network 12. The emulated LAN 10 comprises a plurality of LAN Emulation Clients (LEC's) 14 and a single LAN Emulation Service (LE Service) 16. Each LEC 14 is a part of an ATM end station which may comprise a host 24, a bridge 26, or a router 28. The LE Service 16 comprises a LAN Emulation Configuration Server (LECS) 18, a LAN Emulation Server (LES) 20, and a Broadcast and Unknown Server (BUS) 22. It should be noted that the LES 20 and the BUS 22 are shown coupled together as a combined LES/BUS server 30 because they always coexist in an emulated LAN.

To minimize resource utilization in the ATM network 12, it is possible to distribute a plurality of the LES/BUS servers 30 throughout the ATM network 12, and to assign each LEC 14 to a "local" LES/BUS server 30. For example, referring to FIG. 2, an emulated LAN 40 is shown with a plurality of LES/BUS subservers 42 distributed throughout the ATM network 12. Each LEC 14 is typically assigned to a local LES/BUS subserver 42, thereby forming a corresponding plurality of LES/BUS subserver groups 44, 46, 48, and 50.

Figure 2:
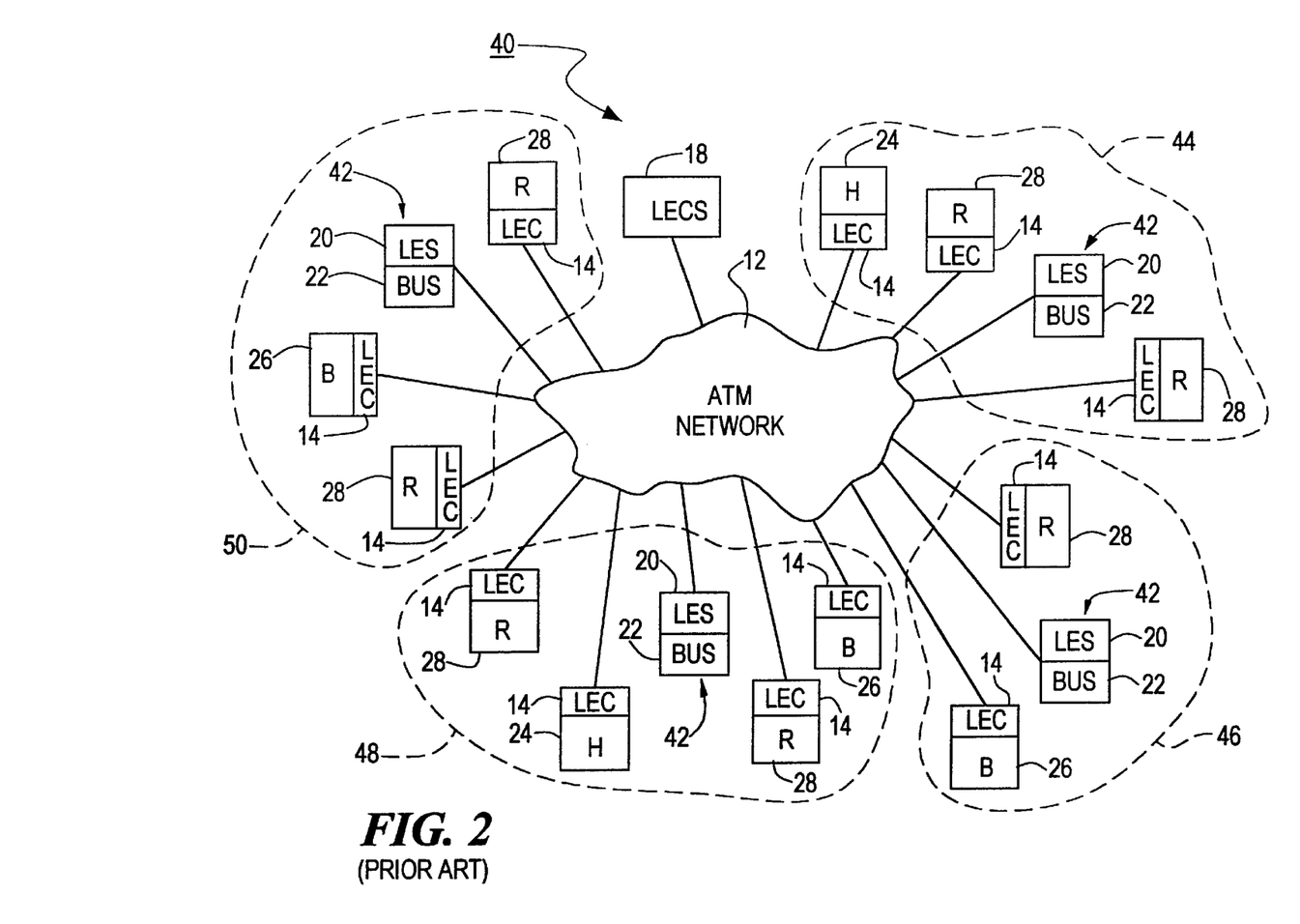
FIG. 2 is a block diagram illustrating a prior art network topology of an emulated LAN having a plurality of LES/BUS subservers distributed throughout an ATM network.

The LES/BUS subservers 42 in the LES/BUS subserver groups 44, 46, 48, and 50 operate in a manner that is similar to the LES/BUS server 30 described above, but they result in less utilization of resources in the ATM network 12 since messages sent between LEC's 14 and local LES/BUS subservers 42 are required to travel shorter distances through the ATM network 12.

Figure 3:
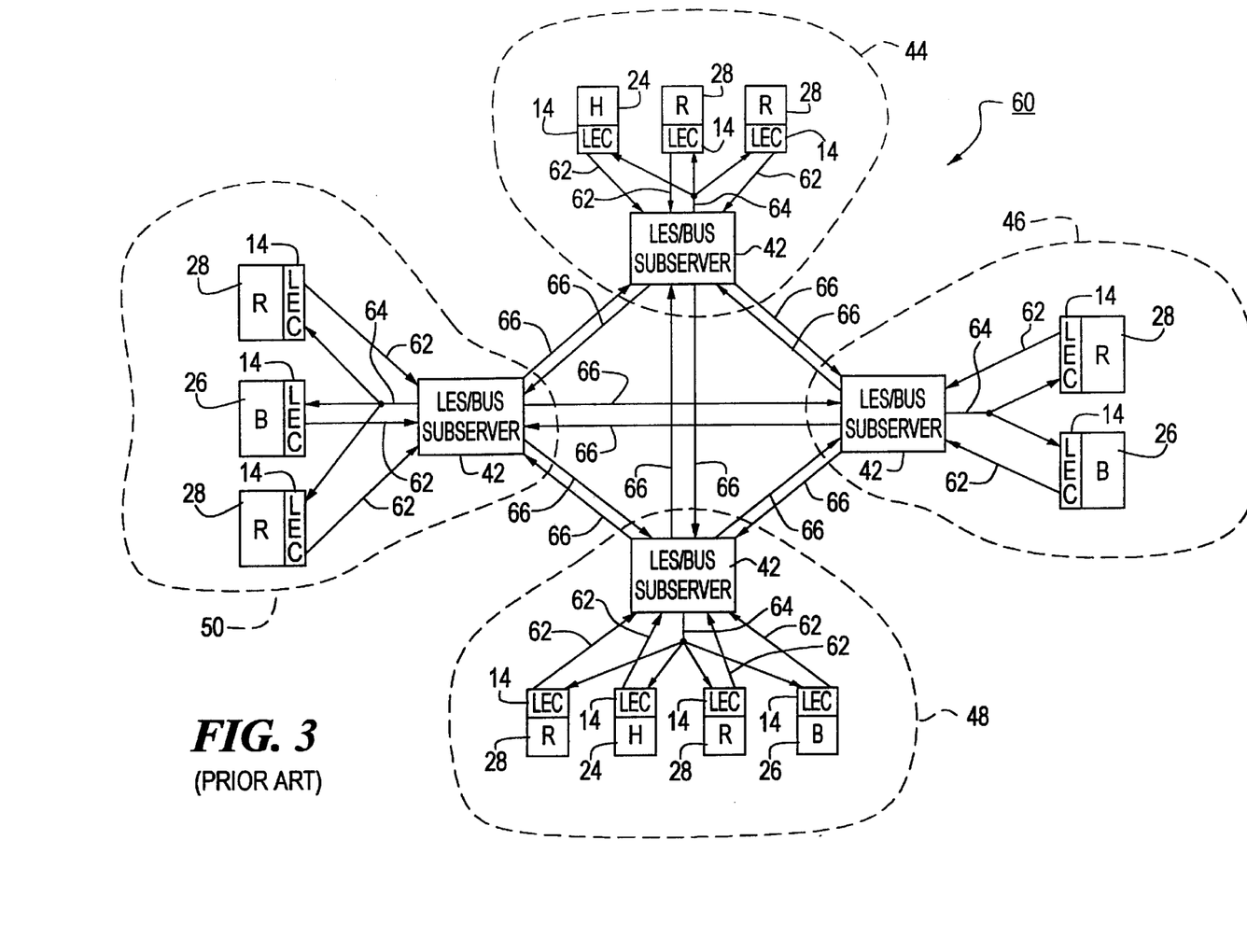
FIG. 3 is a block diagram illustrating a prior art connection topology for VCC's established between each LEC and its local LES/BUS subserver and between LES/BUS subservers in an emulated LAN.

Referring to FIG. 3, an emulated LAN 60 is shown illustrating the various VCC's which are established between each LEC 14 and its local LES/BUS subserver 42 and between the plurality of LES/BUS subservers 42. A point-to-point VCC 62 is directed from each LEC 14 to its local LES/BUS subserver 42, and a point-to-multipoint VCC 64 is directed from each LES/BUS subserver 42 to all of the "local" LEC's 14 within a corresponding LES/BUS subserver group 44, 46, 48, or 50. Also, a point-to-point VCC 66 is directed from each LES/BUS subserver 42 to every other LES/BUS subserver 42 within the emulated LAN 60.

The point-to-point VCC's 62 allow each LEC 14 to send data frames from associated user devices to its local LES/BUS subserver 42. The point-to-point VCC's 66 allow each LES/BUS subserver 42 to distribute data frames from local LEC's 14 to other LES/BUS subservers 42 within the emulated LAN 60. The point-to-multipoint VCC's 64 allow each LES/BUS subserver 42 to distribute data frames from local LEC's 14 and other LES/BUS subservers 42 to all of the local LEC's 14 within a corresponding LES/BUS subserver group 44, 46, 48, or 50.

It should be noted that the emulated LAN 60 may be constructed with different VCC's established between each LEC 14 and its local LES/BUS subserver 42 and between the plurality of LES/BUS subservers 42. For example, a point-to-point VCC may be directed from each LES/BUS subserver 42 to each local LEC 14 within a corresponding LES/BUS subserver group 44, 46, 48, or 50. Also, a point-to-multipoint VCC may be directed from each LES/BUS subserver 42 to all of the other LES/BUS subservers 42 within the emulated LAN 60.

The emulated LAN 60 may be divided into multiple VLAN's. For example, each LEC may represent one or more user devices which belong to one or more VLAN's. Consequently, each data frame which is sent over the point-to-point VCC's 62 from each LEC 14 to its local LES/BUS subserver 42 will contain a VLAN tag which identifies the VLAN from which the data frame originated. That is, the VLAN tag identifies the VLAN of the user device from which the data frame originated.

In accordance with the present invention, each LES/BUS subserver 42 maintains a dynamic VLAN membership table which lists all of the VLAN's that are supported by the emulated LAN 60 and the VCC's which provide connections to those VLAN's. Each LES/BUS subserver 42 updates its own VLAN membership table by virtue of a VLAN Membership Registration Protocol (VMRP) registration request message which is broadcast by each user device. Each LES/BUS subserver 42 may employ its own VLAN membership table to selectively forward received data frames having VLAN tags over established VCC's which provide connections to those VLAN's which are identified by the VLAN tags contained in the received data frames. Alternatively, each LES/BUS subserver 42 may employ its own VLAN membership table to establish additional VCC's over which received data frames having VLAN tags may be forwarded in a more efficient manner.

Figure 4:
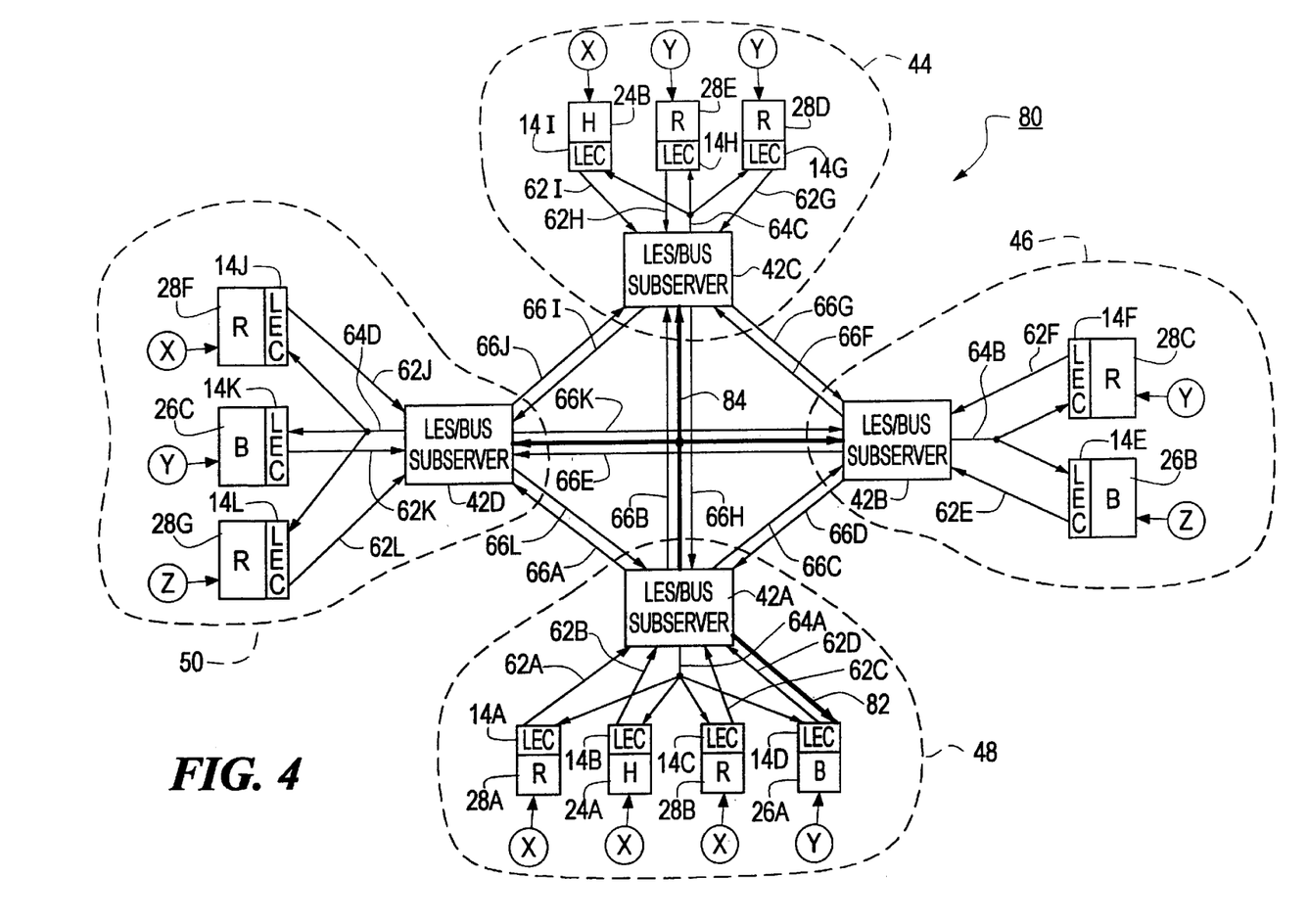
FIG. 4 is a block diagram illustrating a connection topology for VCC's established between each LEC and its local LES/BUS subserver and between LES/BUS subservers in an emulated LAN supporting multiple VLAN's in accordance with the present invention.

Referring to FIG. 4, an emulated LAN 80 supporting multiple VLAN's is shown illustrating the various VCC's which are established between each LEC 14 and its local LES/BUS subserver 42 and between the plurality of LES/BUS subservers 42, along with some additional VCC's which are established by LES/BUS subserver 42A to more efficiently forward received data frames having VLAN tags in accordance with the present invention. FIG. 4 also shows the VLAN membership (e.g., X, Y, or Z) of each user device represented by an LEC 14. That is, user devices having membership with VLAN X are represented by LEC's 14A, 14B, 14C, 14I, and 14J, user devices having membership with VLAN Y are represented by LEC's 14D, 14F, 14G, 14H, and 14K, and user devices having membership with VLAN Z are represented by LEC's 14E and 14L.

Each LEC 14 in the emulated LAN 80 represents one or more user devices through an attached ATM end station (e.g., a host 24, bridge 26, or router 28). Each user device will broadcast a VMRP registration request message which includes VLAN membership information. Each VMRP registration request message that is broadcast by a user device is received by an LEC 14 which represents the user device. The representative LEC 14 then sends the VLAN membership information contained in the received VMRP registration request message to its local LES/BUS subserver 42 for distribution throughout the emulated LAN 80. That is, the local LES/BUS subserver 42 will distribute the VLAN membership information of the originating user device to the other LES/BUS subservers 42 in the emulated LAN 80.

As previously stated, each LES/BUS subserver 42 in the emulated LAN 80 maintains a dynamic VLAN membership table which lists all of the VLAN's that are supported by the emulated LAN 80 and the VCC's which provide connections to those VLAN's. Each LES/BUS subserver 42 updates its own VLAN membership table with the VLAN membership information that it receives from its local LEC's 14 and the other LES/BUS subservers 42 in the emulated LAN 80. To illustrate this concept, FIG. 5A provides the VLAN membership table for LES/BUS subserver 42A.

In the VLAN membership table for LES/BUS subserver 42A, each VLAN supported by the emulated LAN 80 is listed, along with a wildcard entry "*" which will be described in detail below. The VLAN membership table for LES/BUS subserver 42A also lists all of the output connections (VCC's) provided by LES/BUS subserver 42A. The table is filled according to whether a connection to a VLAN is possible through any particular VCC. For example, the point-to-point VCC 66A provides a connection to VLAN Y. In addition, for the point-to-multipoint VCC 64A, the particular LEC to which the connection is made is also entered. For example, the point-to-multipoint VCC 64A provides a connection to VLAN X through LEC's 14A, 14B, and 14C.

Figure 5A:
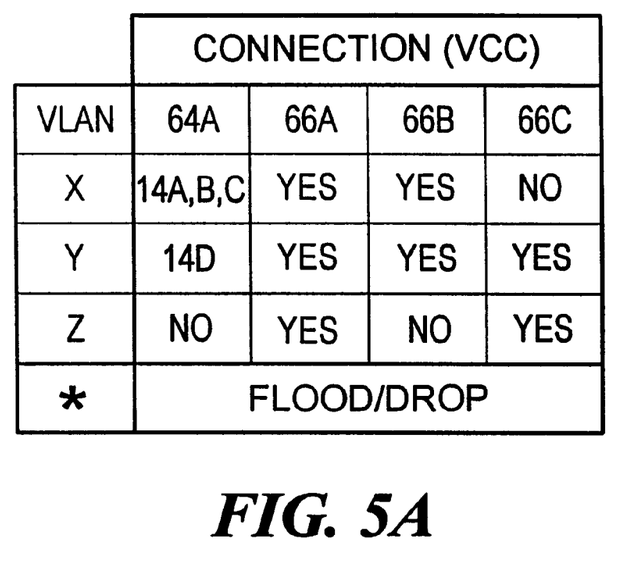
FIG. 5A is a VLAN membership table for a LES/BUS subserver in accordance with the present invention.

With the information listed in the VLAN membership table shown in FIG. 5A, LES/BUS subserver 42A may more efficiently forward received data frames having VLAN tags. For example, if LES/BUS subserver 42A receives a data frame having a VLAN Y tag from LES/BUS subserver 42B, then LES/BUS subserver 42A would ordinarily forward the data frame over the point-to-multipoint VCC 64A since that is the only VCC available which provides a connection to LEC 14D, which represents at least one user device that is a member of VLAN Y. However, the data frame would also be forwarded to LEC's 14A, 14B, and 14C, which do not represent user devices that are members of VLAN Y. Thus, the data frame would be unnecessarily forwarded to LEC's 14A, 14B, and 14C, which would process and then most likely simply discard the data frame.

In accordance with the present invention, after consulting its VLAN membership table, LES/BUS subserver 42A may choose to establish a point-to-point VCC 82 directed from LES/BUS subserver 42A to LEC 14D. The data frame from LES/BUS subserver 42B having the VLAN Y tag could then be forwarded from LES/BUS subserver 42A over this newly established point-to-point VCC 82 only to LEC 14D. This would be a more efficient utilization of network resources since LEC's 14A, 14B, and 14C would no longer have to process the data frame.

LES/BUS subserver 42A makes a determination as to what is the most efficient utilization of network resources based upon a predetermined threshold value. That is, if the number of LEC's 14 to which a received data frame may be unnecessarily forwarded is greater than a predetermined threshold value, then LES/BUS subserver 42A will establish an additional VCC in order to more efficiently forward the received data frame. It should be noted that this predetermined threshold value may be selected for each individual LES/BUS subserver 42, or there may be a standardized threshold value for use throughout the entire emulated LAN 80.

Conversely, if the number of LEC's 14 to which a received data frame may be unnecessarily forwarded is less than the predetermined threshold value, then a LES/BUS subserver 42 will not establish an additional VCC. Assume the predetermined threshold value equals 2 for purposes of illustration. If LES/BUS subserver 42A receives a data frame having a VLAN X tag from LES/BUS subserver 42D, then LES/BUS subserver 42A would forward the data frame over the point-to-multipoint VCC 64A since that is the only VCC available which provides a connection to LEC's 14a, 14B, and 14C, which represent user devices that are members of VLAN X. Furthermore, LES/BUS subserver 42A would not establish any additional VCC's even though the data frame would be unnecessarily forwarded to LEC 14D. This is so because the processing of the data frame by LEC 14D would not justify establishing an additional point-to-multipoint VCC for LEC's 14a, 14B, and 14C according to the predetermined threshold value.

LES/BUS subserver 42A will also make a network efficiency determination when forwarding data frames to the other LES/BUS subservers 42B, 42C, and 42D in the emulated LAN 80. For example, if LES/BUS subserver 42A receives a data frame having a VLAN Y tag from LEC 14D, then LES/BUS subserver 42A would ordinarily forward the data frame over the point-to-point VCC 66A to LES/BUS subserver 42D since that is the only VCC available which will provide a connection (through LES/BUS subserver 42D) to LEC 14K, which represents at least one user device that is a member of VLAN Y. Also, LES/BUS subserver 42A would ordinarily forward the data frame over the point-to-point VCC 66B to LES/BUS subserver 42C since that is the only VCC available which will provide a connection (through LES/BUS subserver 42C) to LEC's 14G and 14H, which represent user devices that are members of VLAN Y. Furthermore, LES/BUS subserver 42A would ordinarily forward the data frame over the point-to-point VCC 66C to LES/BUS subserver 42B since that is the only VCC available which will provide a connection (through LES/BUS subserver 42B) to LEC 14F, which represents at least one user device that is a member of VLAN Y.

The forwarding of the data frame over each of these point-to-point VCC's 66A, 66B, and 66C is not an efficient utilization of network resources since it takes times for LES/BUS subserver 42A to reproduce the data frame. Thus, in accordance with the present invention, after consulting its VLAN membership table, LES/BUS subserver 42A may choose to establish a point-to-multipoint VCC 84 directed from LES/BUS subserver 42A to each of the other LES/BUS subservers 42B, 42C, and 42D in the emulated LAN 80. The data frame from LEC 14D having the VLAN Y tag could then be forwarded from LES/BUS subserver 42A over this point-to-multipoint VCC 84 to each of the other LES/BUS subservers 42B, 42C, and 42D in the emulated LAN 80. This would be a more efficient utilization of network resources since LES/BUS subserver 42A would no longer have to reproduce the data frame.

Again, LES/BUS subserver 42A makes a determination as to what is the most efficient utilization of network resources based upon a predetermined threshold value. That is, if the number of LES/BUS subservers 42 to which a received data frame must be forwarded is greater than a predetermined threshold value, then LES/BUS subserver 42A will establish an additional VCC in order to more efficiently forward the received data frame. Again, it should be noted that this predetermined threshold value may be chosen by each individual LES/BUS subserver 42, or there may be a standardized threshold value for use throughout the entire emulated LAN 80.

Again conversely, if the number of LES/BUS subservers 42 to which a received data frame must be forwarded is less than the predetermined threshold value, then a LES/BUS subserver 42 will not establish an additional VCC. Assume the predetermined threshold value equals 2 for purposes of illustration. If LES/BUS subserver 42A receives a data frame having a VLAN X tag from LEC 14A, then LES/BUS subserver 42A would forward the data frame over the point-to-point VCC's 66A and 66B since they are the only VCC's available which provide a connection to LEC's 14J and 14I, respectively, which represent user devices that are members of VLAN X. Furthermore, LES/BUS subserver 42A would not establish any additional VCC's even though the data frame would need to be reproduced by LES/BUS subserver 42A. This is so because the reproduction processing time of the data frame by LES/BUS subserver 42A would not justify establishing an additional point-to-multipoint VCC for LES/BUS subservers 42C and 42D according to the predetermined threshold value.

At this point it should be noted that the wildcard entry "*" listed in the VLAN membership table shown in FIG. 5A may be used at the start-up of the emulated LAN 80 before the VLAN membership table is filled. The wildcard entry "*" may also be used if no connections are found in the VLAN membership table for a particular VLAN. The wildcard entry "*" may be set to have a data frame flooded though all the VCC's or dropped so as not to be forwarded anywhere.

In the case of legacy (i.e., conventional) user devices which do not broadcast VMRP registration request messages or provide data frames having VLAN tags, a LES/BUS subserver 42 will have to look further into the data frames that are sent by such user devices to find information which identifies the VLAN of the respective user device. That is, the LES/BUS subserver 42 may have to look at the MAC source address, ethertype, or other information contained in the data frame of a legacy user device in order to determine VLAN membership for subsequent data frame forwarding. These and other ingress/egress rules are often employed to facilitate data frame analysis and forwarding.

Figure 5B:
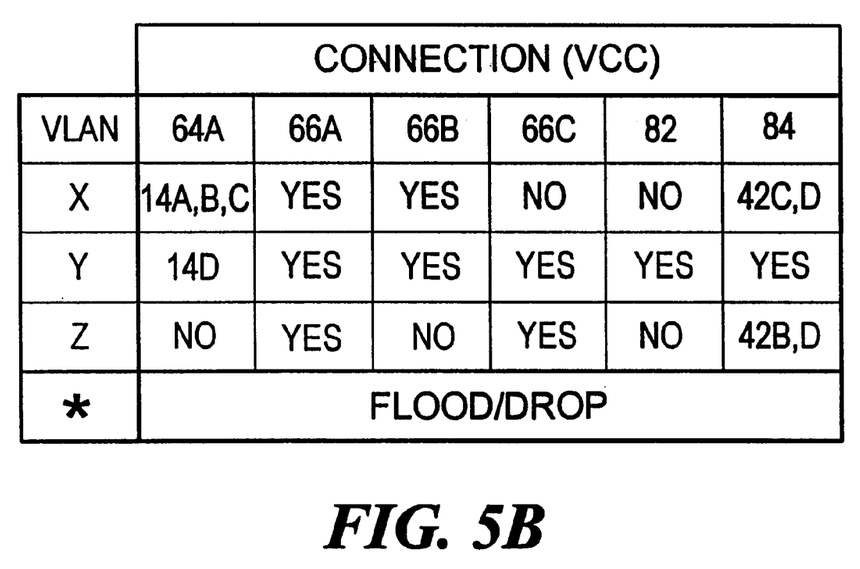
FIG. 5B is an updated VLAN membership table for a LES/BUS subserver in accordance with the present invention.

Referring to FIG. 5B, there is shown an updated VLAN membership table for LES/BUS subserver 42A. This updated VLAN membership table has listings for a newly established point-to-point VCC 82 and point-to-multipoint VCC 84, along with associated connection information.

Figure 6:
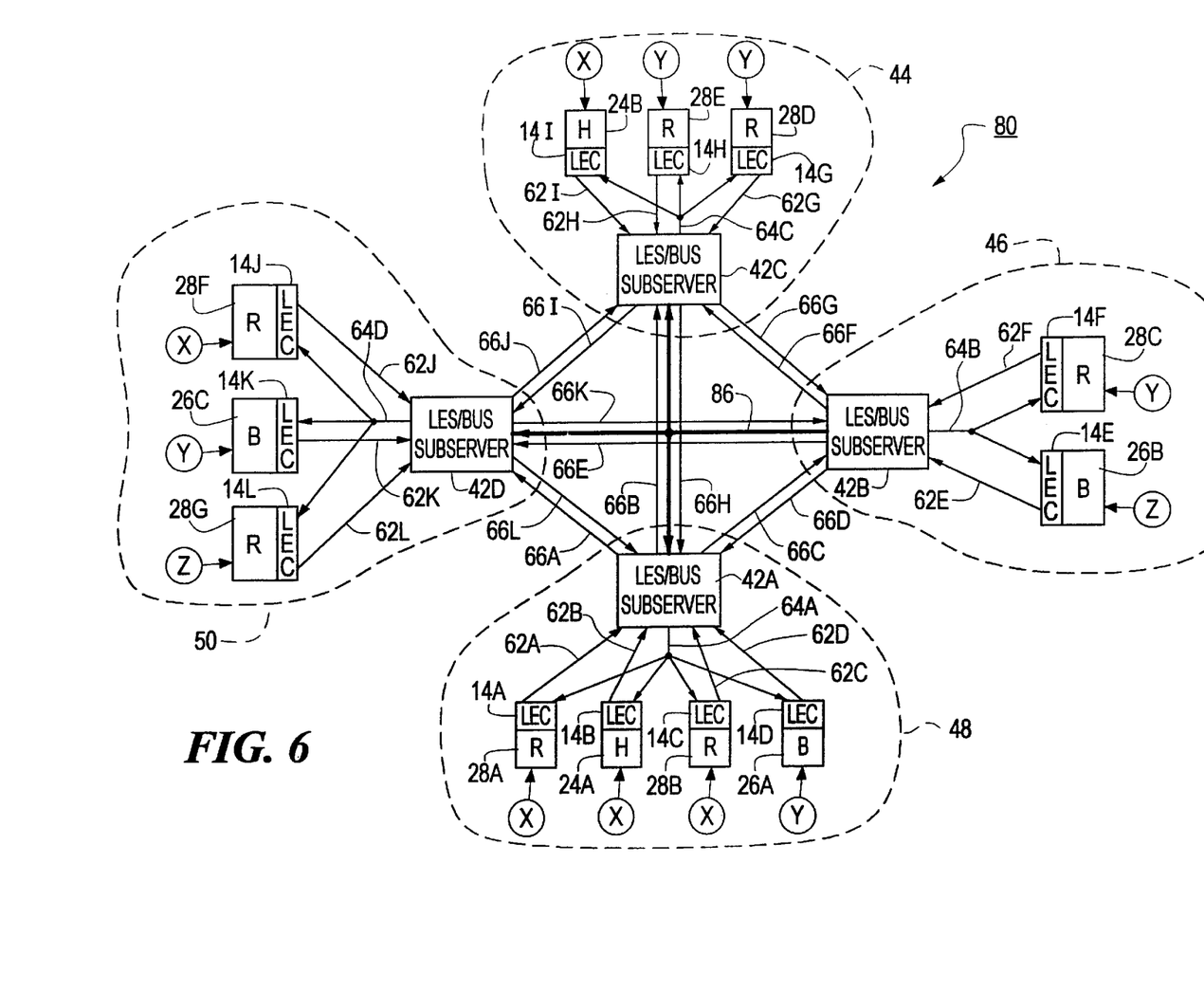
FIG. 6 is a block diagram illustrating a connection topology for VCC's established between each LEC and its local LES/BUS subserver and between LES/BUS subservers in an emulated LAN supporting multiple VLAN's in accordance with the present invention.
Figure 7A:
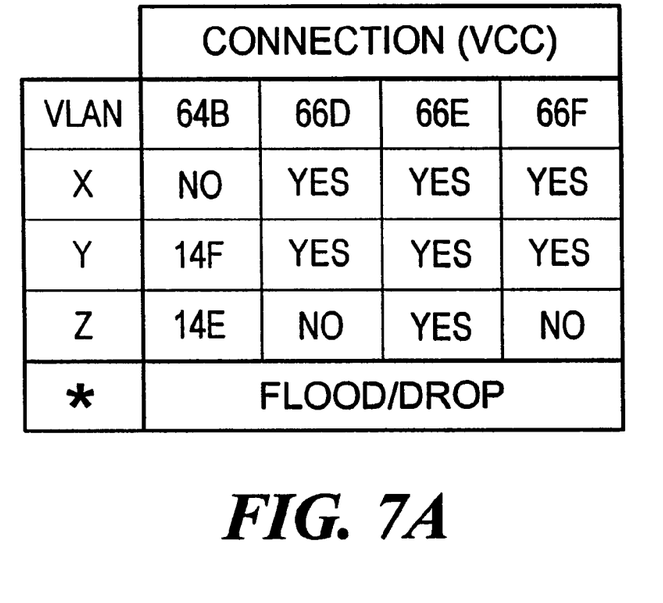
FIG. 7A is a VLAN membership table for a LES/BUS subserver in accordance with the present invention.

Referring to FIG. 6, the emulated LAN 80 is shown illustrating the various VCC's which are established between each LEC 14 and its local LES/BUS subserver 42 and between the plurality of LES/BUS subservers 42, along with an additional VCC which is established by LES/BUS subserver 42B to more efficiently forward received data frames having VLAN tags in accordance with the present invention. FIG. 7A provides the VLAN membership table for LES/BUS subserver 42B. Similar to LES/BUS subserver 42A, after consulting its VLAN membership table, LES/BUS subserver 42B may choose to establish a point-to-multipoint VCC 86 directed from LES/BUS subserver 42B to each of the other LES/BUS subservers 42A, 42C, and 42D in the emulated LAN 80. The point-to-multipoint VCC 86 would allow a data frame having a VLAN Y tag from, for example, LEC 14F to be forwarded from LES/BUS subserver 42B to each of the other LES/BUS subservers 42A, 42C, and 42D in the emulated LAN 80. This would be a more efficient utilization of network resources since LES/BUS subserver 42B would no longer have to reproduce the data frame.

Figure 7B:
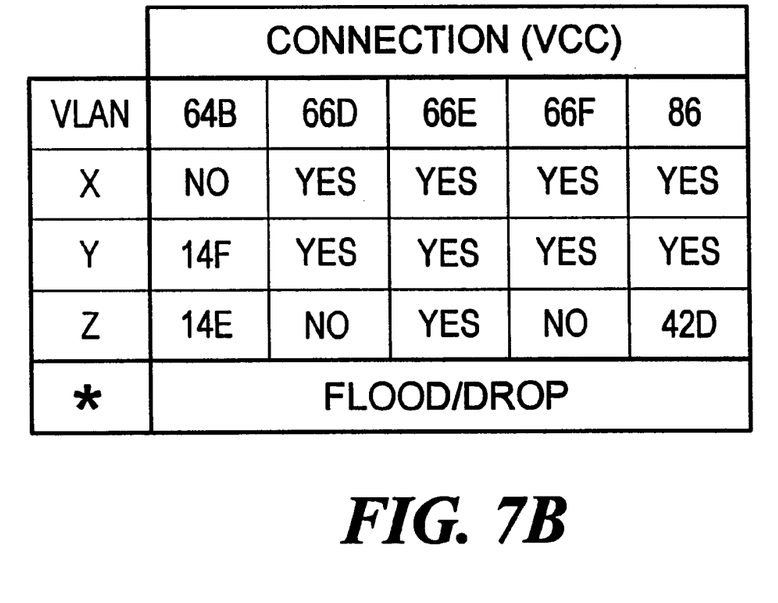
FIG. 7B is an updated VLAN membership table for a LES/BUS subserver in accordance with the present invention.

Referring to FIG. 7B, there is shown an updated VLAN membership table for LES/BUS subserver 42B. This updated VLAN membership table has listings for a newly established point-to-multipoint VCC 86, along with associated connection information.

Figure 8:
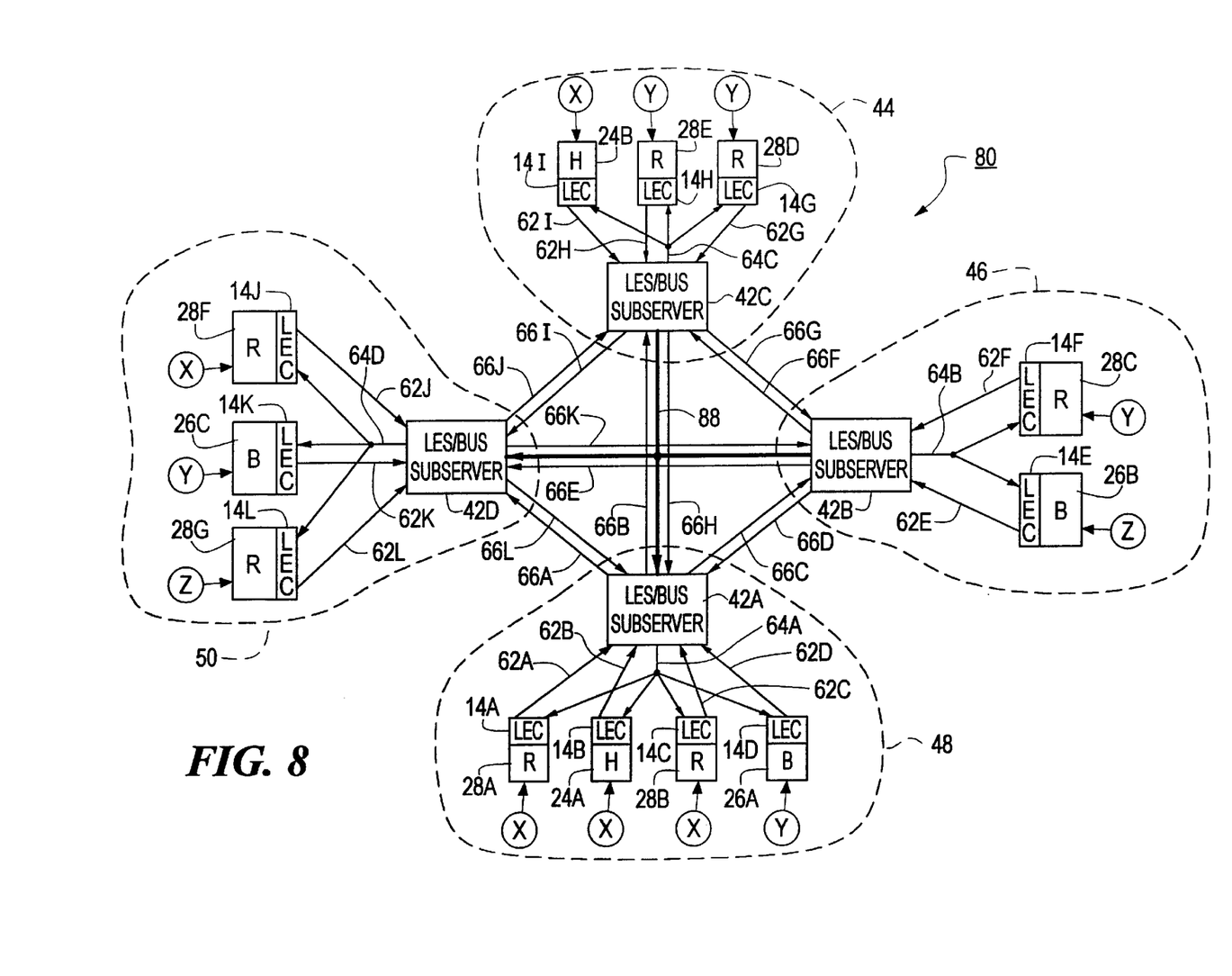
FIG. 8 is a block diagram illustrating a connection topology for VCC's established between each LEC and its local LES/BUS subserver and between LES/BUS subservers in an emulated LAN supporting multiple VLAN's in accordance with the present invention.
Figure 9A:
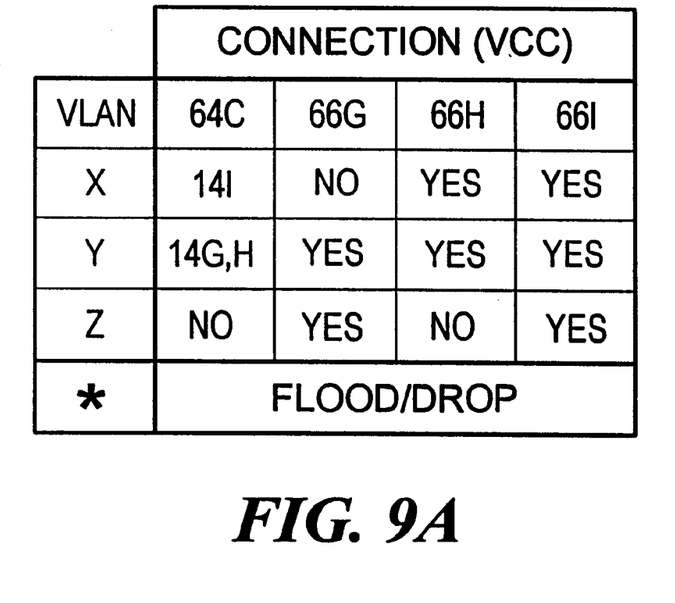
FIG. 9A is a VLAN membership table for a LES/BUS subserver in accordance with the present invention.

Referring to FIG. 8, the emulated LAN 80 is shown illustrating the various VCC's which are established between each LEC 14 and its local LES/BUS subserver 42 and between the plurality of LES/BUS subservers 42, along with an additional VCC 88 which is established by LES/BUS subserver 42C to more efficiently forward received data frames having VLAN tags in accordance with the present invention. FIG. 9A provides the VLAN membership table for LES/BUS subserver 42C. Similar to LES/BUS subservers 42A and 42B, after consulting its VLAN membership table, LES/BUS subserver 42C determine that a point-to-multipoint VCC 88 directed from LES/BUS subserver 42C to each of the other LES/BUS subservers 42A, 42B, and 42D in the emulated LAN 80 should be established in the manner previously discussed. The point-to-multipoint VCC 88 would allow a data frame having a VLAN Y tag from, for example, LEC 14G to be forwarded from LES/BUS subserver 42C to each of the other LES/BUS subservers 42A, 42B and 42D in the emulated LAN 80. This would be a more efficient utilization of network resources since LES/BUS subserver 42C would no longer have to reproduce the data frame.

Figure 9B:
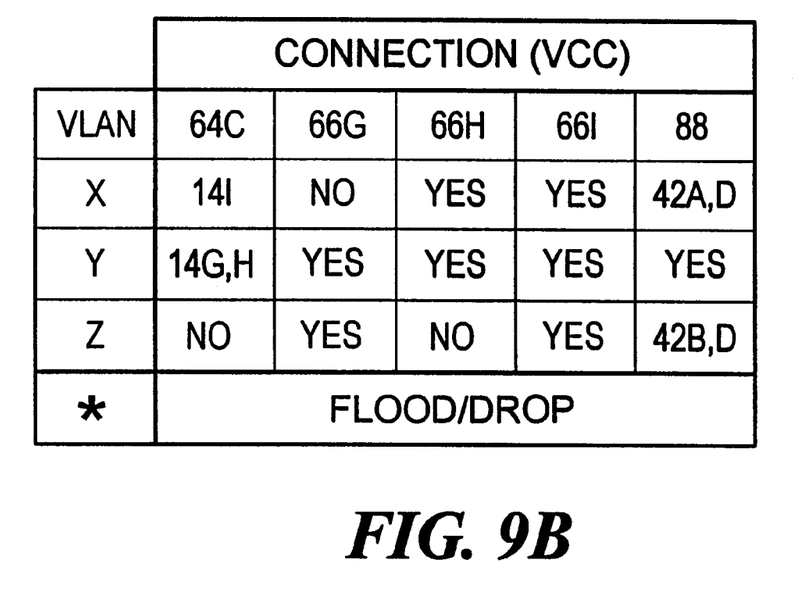
FIG. 9B is an updated VLAN membership table for a LES/BUS subserver in accordance with the present invention.

Referring to FIG. 9B, there is shown an updated VLAN membership table for LES/BUS subserver 42C. This updated VLAN membership table has listings for a newly established point-to-multipoint VCC 88, along with associated connection information.

Figure 10:
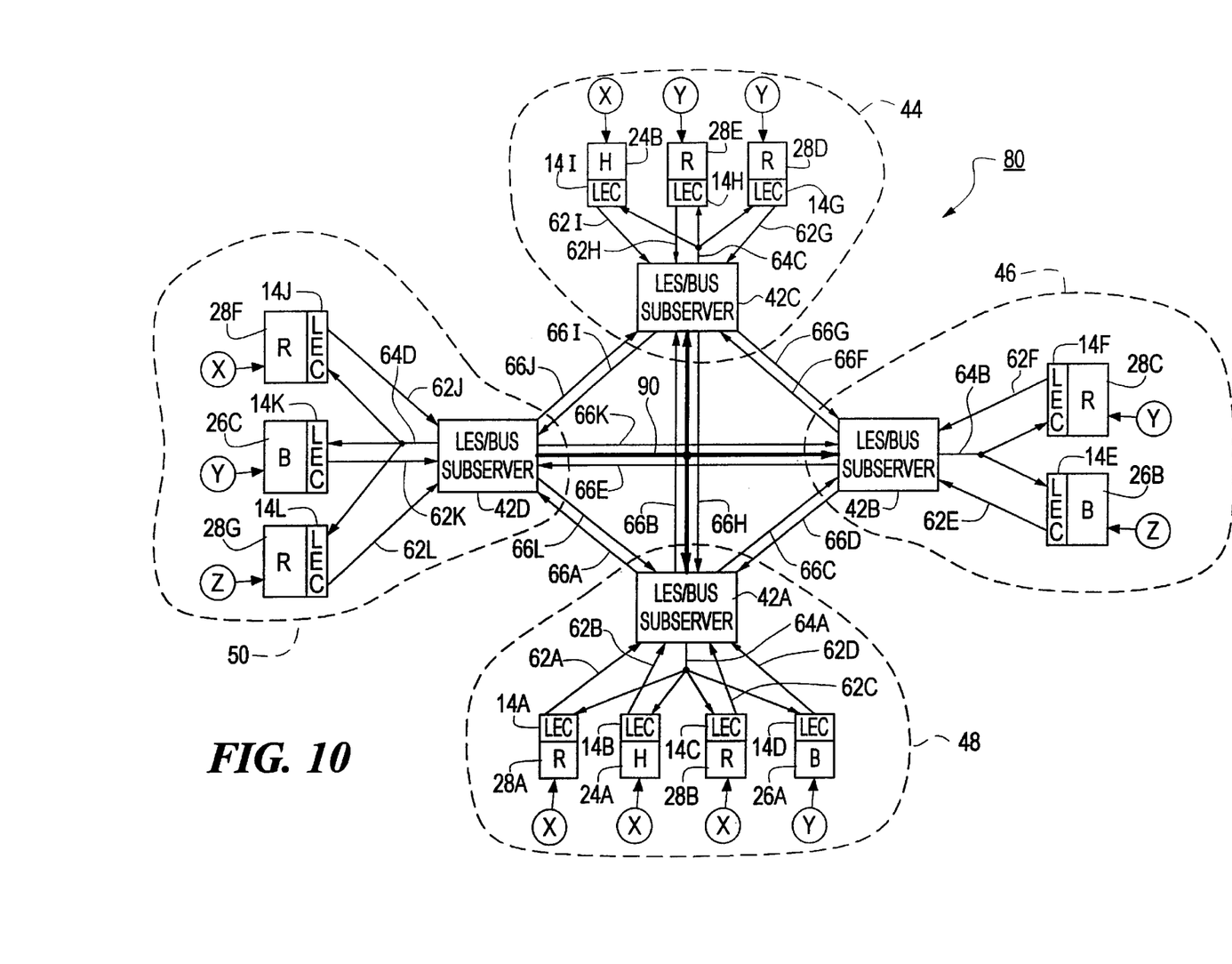
FIG. 10 is a block diagram illustrating a connection topology for VCC's established between each LEC and its local LES/BUS subserver and between LES/BUS subservers in an emulated LAN supporting multiple VLAN's in accordance with the present invention.
Figure 11A:
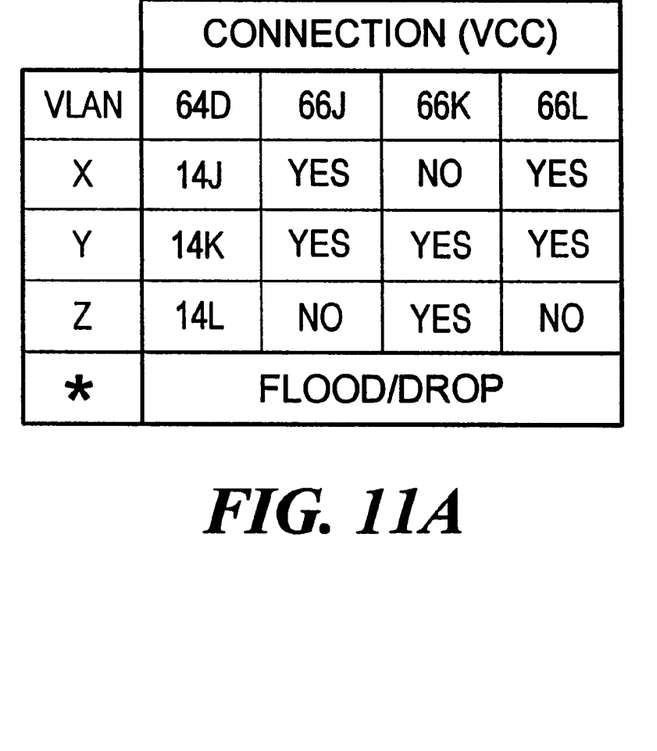
FIG. 11A is a VLAN membership table for a LES/BUS subserver in accordance with the present invention.

Referring to FIG. 10, the emulated LAN 80 is shown illustrating the various VCC's which are established between each LEC 14 and its local LES/BUS subserver 42 and between the plurality of LES/BUS subservers 42, along with an additional VCC which is established by LES/BUS subserver 42D to more efficiently forward received data frames having VLAN tags in accordance with the present invention. FIG. 11A provides the VLAN membership table for LES/BUS subserver 42D. Similar to LES/BUS subservers 42A, 42B, and 42C, after consulting its VLAN membership table, LES/BUS subserver 42D may choose to establish a point-to-multipoint VCC 90 directed from LES/BUS subserver 42D to each of the other LES/BUS subservers 42A, 42B, and 42C in the emulated LAN 80. The point-to-multipoint VCC 90 would allow a data frame having a VLAN Y tag from, for example, LEC 14K to be forwarded from LES/BUS subserver 42D to each of the other LES/BUS subservers 42A, 42B, and 42C in the emulated LAN 80. This would be a more efficient utilization of network resources since LES/BUS subserver 42D would no longer have to reproduce the data frame.

Figure 11B:
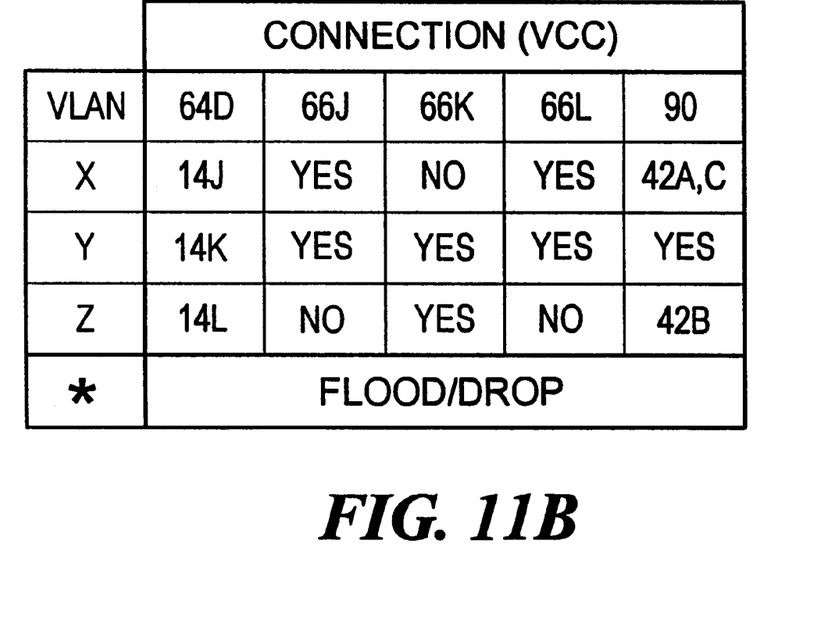
FIG. 11B is an updated VLAN membership table for a LES/BUS subserver in accordance with the present invention.

Referring to FIG. 11B, there is shown an updated VLAN membership table for LES/BUS subserver 42D. This updated VLAN membership table has listings for a newly established point-to-multipoint VCC 90, along with associated connection information.

It should be noted that the emulated LAN 80 may initially be constructed with different VCC's established between each LEC 14 and its local LES/BUS subserver 42 and between the plurality of LES/BUS subservers 42. For example, point-to-point VCC's may initially be directed from a LES/BUS subserver 42 to each local LEC 14 within a corresponding LES/BUS subserver group 44, 46, 48, or 50. In such a case, the LES/BUS subserver 42 may determine that a more efficient utilization of network resources would be to establish a point-to-multipoint VCC to specific LEC's 14 within the corresponding LES/BUS subserver group 44, 46, 48, or 50. Also, a point-to-multipoint VCC may initially be directed from each LES/BUS subserver 42 to all of the other LES/BUS subservers 42 within the emulated LAN 60. In such a case, the LES/BUS subserver 42 may determine that a more efficient utilization of network resources would be to establish point-to-point VCC's to specific LES/BUS subservers 42 within the emulated LAN 60.

In all of the above-described examples, a LES/BUS subserver 42 consults its own VLAN membership table and then makes a determination regarding the most efficient utilization of network resources based upon a predetermined threshold value.

It will be understood by those of ordinary skill in the art that other embodiments and variations on the presently disclosed embodiments may be envisioned without departing from the inventive concepts disclosed herein. Accordingly, the present invention is not to be viewed as limited, except in accordance with the scope and spirit of the appended claims.

What is claimed is:

1. A method for efficiently supporting multiple VLAN's over an emulated LAN having a plurality of distributed LAN emulation servers, said method comprising the steps of:

receiving a data frame having a VLAN tag at a distributed LAN emulation server, said distributed LAN emulation server having a plurality of point-to-point output connections directed from said distributed LAN emulation server to a corresponding plurality of LAN emulation destinations, said distributed LAN emulation server having a list of VLAN's that are reachable over each of said plurality of point-to-point output connections, said distributed LAN emulation server having a predetermined threshold value;

identifying the number of said plurality of point-to-point output connections over which the VLAN corresponding to said VLAN tag is reachable;

comparing said number to said predetermined threshold value;

if said number is less than or equal to said predetermined threshold value, forwarding said data frame over those of said plurality of point-to-point output connections over which the VLAN corresponding to said VLAN tag is reachable; and if said number is greater than said predetermined threshold value, establishing a point-to-multipoint output connection directed from said distributed LAN emulation server to each of said plurality of LAN emulation destinations through which the VLAN corresponding to said VLAN tag is reachable.

2. The method as defined in claim 1, further comprising the step of forwarding said data frame over said established point-to-multipoint output connection to each of said plurality of LAN emulation destinations through which the VLAN corresponding to said VLAN tag is reachable.

3. The method as defined in claim 1, further comprising the step of forwarding said data frame over all of said plurality of point-to-point output connections if said list of VLAN's does not include a connection over which the VLAN corresponding to said VLAN tag is reachable.

4. The method as defined in claim 1, further comprising the step of dropping said data frame if said list of VLAN's does not include a connection over which the VLAN corresponding to said VLAN tag is reachable.

5. The method as defined in claim 1, further comprising the step of analyzing other parameters of said data frame for VLAN membership.

6. A method for efficiently supporting multiple VLAN's over an emulated LAN having a plurality of distributed LAN emulation servers, said method comprising the steps of:

receiving a data frame having a VLAN tag at a distributed LAN emulation server, said distributed LAN emulation server having a point-to-multipoint output connection directed from said distributed LAN emulation server to a plurality of LAN emulation destinations, said distributed LAN emulation server having a list of VLAN's that are reachable over said point-to-multipoint output connection through each of said plurality of LAN emulation destinations, said distributed LAN emulation server having a predetermined threshold value;

identifying the number of said plurality of LAN emulation destinations through which the VLAN corresponding to said VLAN tag is reachable;

comparing said number to said predetermined threshold value;

if said number is greater than or equal to said predetermined threshold value, forwarding said data frame over said point-to-multipoint output connection to each of said plurality of LAN emulation destinations; and if said number is less than said predetermined threshold value, establishing a point-to-point output connection directed from said distributed LAN emulation server to each of said plurality of LAN emulation destinations through which the VLAN corresponding to said VLAN tag is reachable.

7. The method as defined in claim 6, further comprising the step of forwarding said data frame over each said established point-to-point output connection to each of said plurality of LAN emulation destinations through which the VLAN corresponding to said VLAN tag is reachable.

8. The method as defined in claim 6, further comprising the step of forwarding said data frame over said point-to-multipoint output connection if said list of VLAN's does not include a connection over which the VLAN corresponding to said VLAN tag is reachable.

9. The method as defined in claim 6, further comprising the step of dropping said data frame if said list of VLAN's does not include a connection over which the VLAN corresponding to said VLAN tag is reachable.

10. The method as defined in claim 6, further comprising the step of analyzing other parameters of said data frame for VLAN membership.

11. An apparatus for efficiently supporting multiple VLAN's over an emulated LAN, said apparatus comprising:

a distributed LAN emulation server for receiving a data frame having a VLAN tag, said distributed LAN emulation server having a plurality of point-to-point output connections directed from said distributed LAN emulation server to a corresponding plurality of LAN emulation destinations, said distributed LAN emulation server having a list of VLAN's that are reachable over each of said plurality of point-to-point output connections, said distributed LAN emulation server having a predetermined threshold value for determining the most efficient utilization of said plurality of point-to-point output connections;

said distributed LAN emulation server being operative to identify the number of said plurality of point-to-point output connections over which the VLAN corresponding to said VLAN tag is reachable and to compare said number to said predetermined threshold value;

said distributed LAN emulation server being operative to forward said data frame over those of said plurality of point-to-point output connections over which the VLAN corresponding to said VLAN tag is reachable if said number is less than or equal to said predetermined threshold value; and said distributed LAN emulation server being operative to establish a point-to-multipoint output connection directed from said distributed LAN emulation server to each of said plurality of LAN emulation destinations through which the VLAN corresponding to said VLAN tag is reachable if said number is greater than said predetermined threshold value.

12. The apparatus as defined in claim 11, wherein said distributed LAN emulation server is further operative to forward said data frame over said established point-to-multipoint output connection to each of said plurality of LAN emulation destinations through which the VLAN corresponding to said VLAN tag is reachable.

13. The apparatus as defined in claim 11, wherein said distributed LAN emulation server is further operative to forward said data frame over all of said plurality of point-to-point output connections if said list of VLAN's does not include a connection over which the VLAN corresponding to said VLAN tag is reachable.

14. The apparatus as defined in claim 11, wherein said distributed LAN emulation server is further operative to drop said data frame if said list of VLAN's does not include a connection over which the VLAN corresponding to said VLAN tag is reachable.

15. The apparatus as defined in claim 11, wherein said distributed LAN emulation server is further operative to analyze other parameters of said data frame for VLAN membership.

16. The apparatus as defined in claim 11, wherein at least one of said plurality of LAN emulation destinations is a LAN emulation client.

17. The apparatus as defined in claim 11, wherein at least one of said plurality of LAN emulation destinations is another LAN emulation server.

18. An apparatus for efficiently supporting multiple VLAN's over an emulated LAN, said apparatus comprising a distributed LAN emulation server for receiving a data frame having a VLAN tag, said distributed LAN emulation server having a point-to-multipoint output connection directed from said distributed LAN emulation server to a plurality of LAN emulation destinations, said distributed LAN emulation server having a list of VLAN's that are reachable over said point-to-multipoint output connection through each of said plurality of LAN emulation destinations, said distributed LAN emulation server having a predetermined threshold value for determining the most efficient utilization of said point-to-multipoint output connection;

said distributed LAN emulation server being operative to identify the number of said plurality of LAN emulation destinations through which the VLAN corresponding to said VLAN tag is reachable and to compare said number to said predetermined threshold value;

said distributed LAN emulation server being operative to forward said data frame over said point-to-multipoint output connection to each of said plurality of LAN emulation destinations if said number is greater than or equal to said predetermined threshold value; and said distributed LAN emulation server being operative to establish a point-to-point output connection directed from said distributed LAN emulation server to each of said plurality of LAN emulation destinations through which the VLAN corresponding to said VLAN tag is reachable if said number is less than said predetermined threshold value.

19. The apparatus as defined in claim 18, wherein said distributed LAN emulation server is further operative to forward said data frame over each said established point-to-point output connection to each of said plurality of LAN emulation destinations through which the VLAN corresponding to said VLAN tag is reachable.

20. The apparatus as defined in claim 18, wherein said distributed LAN emulation server is further operative to forward said data frame over said point-to-multipoint output connection if said list of VLAN's does not include a connection over which the VLAN corresponding to said VLAN tag is reachable.

21. The apparatus as defined in claim 18, wherein said distributed LAN emulation server is further operative to drop said data frame if said list of VLAN's does not include a connection over which the VLAN corresponding to said VLAN tag is reachable.

22. The apparatus as defined in claim 18, wherein said distributed LAN emulation server is further operative to analyze other parameters of said data frame for VLAN membership.

23. The apparatus as defined in claim 18, wherein at least one of said plurality of LAN emulation destinations is a LAN emulation client.

24. The apparatus as defined in claim 18, wherein at least one of said plurality of LAN emulation destinations is another LAN emulation server.

25. An apparatus for efficiently supporting multiple VLAN's over an emulated LAN, said apparatus comprising a distributed LAN emulation server for receiving a data frame having a VLAN tag from a LAN emulation source, said distributed LAN emulation server having at least one output connection, said distributed LAN emulation server having a VLAN membership table, said VLAN membership table having an entry for each output connection, said VLAN membership table having an entry for each VLAN supported by said emulated LAN;

said distributed LAN emulation server being operative to determine which output connection provides a connection to said LAN emulation source; and said distributed LAN emulation server being operative to update said VLAN membership table to indicate that the VLAN identified by said VLAN tag is reachable through each output connection that provides a connection to said LAN emulation source.

26. A method for maintaining a VLAN membership table at a distributed LAN emulation server in an emulated LAN, wherein said emulated LAN is capable of supporting multiple VLAN's, said method comprising the steps of:

receiving a data frame having a VLAN tag from a LAN emulation source at a distributed LAN emulation server in an emulated LAN, said distributed LAN emulation server having at least one output connection, said distributed LAN emulation server having a VLAN membership table, said VLAN membership table having an entry for each output connection, said VLAN membership table having an entry for each VLAN supported by said emulated LAN;

determining which output connection provides a connection to said LAN emulation source; and updating said VLAN membership table to indicate that the VLAN identified by said VLAN tag is reachable through each output connection that provides a connection to said LAN emulation source.

* * * * *